UNITED STATES PATENT OFFICE.

ST. JULIEN RAVENEL, OF CHARLESTON, SOUTH CAROLINA.

IMPROVEMENT IN FERTILIZERS.

Specification forming part of Letters Patent No. 171,857, dated January 4, 1876; application filed October 24, 1874.

*To all whom it may concern:*

Be it known that I, ST. JULIEN RAVENEL, of Charleston, in the county of Charleston and State of South Carolina, have invented or discovered a new and useful Material for the Manufacture of Fertilizers; and I do hereby declare the following to be a full and exact description of the same.

My invention consists, first, in the use of iron pyrites in the manufacture of phosphatic manures, which is effected by mixing the pyrites, when finely pulverized, with pulverized phosphatic rock, or substances having similar properties therewith, whereby the pyrites are converted into a highly-useful ingredient in the composition of such manures; and my invention further relates to a fertilizing compound or mixture composed of pulverized iron pyrites and phosphate of lime, in about equal quantities, or with other mineral matter of similar properties with phosphate of lime, as hereinafter mentioned.

To illustrate my invention, and to so describe it that any one skilled in the art can make and use it, I would first state that one hundred pounds of iron pyrites contains forty-seven per cent. of iron and fifty-three per cent. of sulphur, and that, when reduced to an impalpable powder and exposed to the action of the atmosphere, it will absorb ninety-three pounds of oxygen to form sixty-one pounds of protoxide of iron and one hundred and thirty-two pounds of anhydrous sulphuric acid. Sixty-six pounds of this acid unites with the protoxide of iron, and sixty-six pounds remain free.

When iron pyrites and phosphate-of-lime rock are ground together to a very fine powder, and are exposed to the air, either out of or in the soil, sulphate of lime and soluble phosphate of iron are formed. By this proceeding the sulphur and phosphoric acid of these cheap substances can both be utilized without the intervention of an expensive acid-chamber.

The free acid attacks the lime of the phosphate of lime, to make sulphate of lime and soluble phosphate of lime. The iron having a stronger affinity for phosphoric acid than lime, the resultant is phosphate of iron, which is dissolved by the sulphuric acid set free.

In carrying out my invention, I mix together the iron pyrites, previously finely pulverized, and the phosphatic material, also finely ground, in the proportion of about ten parts pyrites to ninety parts rock, the exact proportion varying with the composition of the phosphatic material. This mixture, when introduced into the soil, has the effect above described.

While I have only mentioned phosphate-of-lime rock as the ingredient or modifying substance to be used with the iron pyrites, yet other mineral substances having similar properties with the phosphate-of-lime rock may be used with advantage, and make a good fertilizer.

Having thus fully described the nature of my invention, what I claim is—

1. The herein-described process of manufacturing phosphatic fertilizers, consisting in mixing pulverized iron pyrites with the ground phosphatic material, substantially as described.

2. The improved fertilizer herein described, consisting of a mixture of pulverized iron pyrites and ground phosphatic material, in substantially the proportions specified.

ST. JULIEN RAVENEL.

Witnesses:
 A. B. STOUGHTON,
 JNO. D. PATTEN.